Patented July 31, 1945

2,380,739

UNITED STATES PATENT OFFICE 2,380,739

PROCESS OF PRODUCING PECTINOUS GELS AND COMPOSITION

Lacey H. Evans and Louis J. Huber, Minneapolis, Minn., assignors to General Mills, Inc., a corporation of Delaware No Drawing. Application April 11, 1941, Serial No. 388,102

3 Claims. (Cl. 99—132)

The present invention relates to the formation of gels and more particularly to the gel formation of pectic substances without the presence of a dehydrating agent.

This application is a continuation in part of our application Serial No. 283,462, filed on July 8, 1939.

The principal object of our invention is to provide a process for forming a new gel containing a pectic substance as the gelling agent, without the use of high sugar concentrations.

Another object of our invention is to provide a new gel base in which methyl groups of pectin are replaced by ammonium groups thereby forming an ammonium pectate of superior gelling properties.

A further object of our invention is to provide a rapid-setting gel which may be formed without heating the ingredients thereof.

A still further object of our invention is to provide an efficient and economical process of gel-formation which will enable pectin to be utilized as food or dessert.

It has heretofore been the practice in producing certain types of jellies, to use pectin as the gelling agent. However, the pectin would not gel satisfactorily unless a high percentage of sugar (50%, by weight, to 60%, by weight) was present as a dehydating agent for the pectin and this limited the use of pectin as a food-stuff to jellies and preserves which were necessarily consumed in small quantities due to their excessive sweetness.

We have found that the above-mentioned difficulties may be obviated and that the use of a dehydrating agent such as sugar may be entirely eliminated and that satisfactory gels may be formed from the soluble pectates such as the sodium, potassium or ammonium pectates. In the utilization of any of these materials for the formation of clear, edible jellies, they are dissolved in a suitable quantity of cold water, adding thereto desired flavoring material and coloring matter and/or other suitable ingredients and then adding to the aqueous solution a suitable quantity of a substance which gradually yields a weak, edible acid on hydrolysis, thereby forming a clear and homogeneous gel.

While it is possible to use either a sodium, potassium or ammonium pectate as the gel base, we prefer to use the ammonium pectate produced by exposing pectin to the vapors of ammonia. By the preparation of our gel base in this manner, we obtain an ammonium pectate of high molecular weight which gives excellent gels.

When pectin in solution is acted upon by a solution of sodium or potassium hydroxide for the formation of the alkali pectates, the pectin is rapidly demethylated but, at the same time, undergoes extensive depolymerization. Workers in the pectin field have found that pectin substances of high molecular weight are necessary for the formation of superior gels. They have shown that if the average molecular weight is below 30,000, no gel can be obtained. The best type of gels are formed from pectic materials having molecular weights of 100,000 or better.

In our experience we have found that the treatment of pectic substances with strong alkalies resulted in gels of inferior quality because of their low molecular weight. In the treatment of pectin with the vapors of a weak, volatile alkali such as ammonia we obtain a gel base of superior quality in a more efficient manner. We believe this superior quality is due to the mild action of ammonia in accomplishing demethylation without appreciable lowering of the molecular weight.

We have further found that it is preferable to employ the pectin in the form of thin flakes such as would be produced by a drum dryer. When pectin in this form is acted on by the vapors of ammonia, greater surface is exposed to the action of the alkali vapors than if the pectin were in the powdered form. This results in more intimate contact between the reactants, thus decreasing the time necessary for completion of the demethylation. The shorter the time of treatment necessary to complete the reaction, the less the likelihood of any appreciable depolymerization of the pectin taking place.

In practicing our invention, we expose a suitable quantity of commercial dry pectin preferably in flaked form, spread in thin layers on trays in a closed chamber to the action of the vapors of a concentrated ammonia solution, say 28%, by weight, for a sufficient length of time to enable the ammonia to react with the pectin and replace the methyl groups therein with ammonium groups. For example, under ordinary atmospheric conditions and at room temperatures, a period of approximately 20 hours is required to produce ammonium pectate having the most desirable gelling properties.

The ammonium pectate produced as described above is then dried by any suitable means, such as by exposing it to a current of warm air to eliminate excess ammonia therefrom and to also eliminate any free methyl alcohol therefrom which is formed during the reaction with the ammonia vapors.

The ammonium pectate thus produced may be employed as a gel-forming agent with other food ingredients which are customarily used with pectin such as fruit flavoring, coloring matter, etc. The pectate is dissolved in suitable amount, say about 1%, by weight, in cold water, and any desired flavoring and/or coloring material is added to the aqueous solution, and we then add to the solution a small amount (say, 1% to 5%, by weight) of an organic substance, such as glucono delta lactone, delta rhamnolo lactone, delta mannono lactone, gamma galactono lactone, tetra methyl delta mannono lactone, tetra methyl delta glucono lactone, tetra methyl delta galactono lactone, trimethyl delta arabano lactone, tetra methyl gamma glucono lactone, or trimethyl gamma arabano lactone, which is capable of reacting with the water to gradually yield by hydrolysis molecules of a weak, edible, organic acid, thereby forming a homogeneous gel, after the solution has stood for a period of time, which in the case of glucono delta lactone is a period of 15 to 30 minutes and in the case of the other organic compounds mentioned may be somewhat longer.

As an alternative to the method described above, we may mix the treated pectin in flaked form with all of the other ingredients, i. e., fruit flavoring, fruit coloring matter, organic-acid yielding substance, in dry, powdered form and the desired gel may be formed by merely dissolving the mixture in cold water and permitting it to stand for a period of from about 15 to 30 minutes.

It will, of course, be understood that the length of time required for the formation of a gel will depend upon the amount of acid-forming substance used and upon the nature of the acid-forming substance. For example, it is desirable to incorporate ingredients of such composition and in such manner that all of the molecules of the acid formed by reaction of the acid-forming substances with water will not be produced instantaneously but progressively during the setting of the gel thus to avoid curding and clumping of the ingredients which otherwise might occur during the gel formation, and this result can be readily accomplished by the use of the above-mentioned organic acid-forming compounds which gradually acidify the gel to a pH of approximately 4.0 or less. Other factors affecting the time required for gel formation are the temperature of the aqueous medium in which the gel is formed, and the pH of the added fruit flavoring and/or coloring matter.

The following specific example will serve to illustrate and explain our invention. We took 100 grams of dry, commercial flaked pectin and placed it in a closed chamber where it was exposed to the action of the vapors from 28%, by weight, aqueous ammonia for a period of about 20 hours under conditions of ordinary room temperature. We then placed the thus formed ammonium pectate in a current of circulating warm air at a temperature of not more than 50° C. until it was thoroughly dried.

We then took 1 gram of the ammonium pectate and mixed it with 1½ grams of glucono delta lactone, and this mixture was stirred into 100 grams of cold water, until the solid ingredients had dissolved. This solution was allowed to stand for a period of about 30 minutes, and a clear, firm, transparent gel was formed.

The conditions recited above are not critical for the successful production of ammonium pectate by our improved process. For example, the twenty hour period would not be adequate if the ammonia used were of lower concentration than 28%, by weight. The temperature of the reacting materials and the average thickness of the pectin flakes are also definite factors which influence the time necessary for the completion of the reaction. For example, we prefer to use pectin in the form of flakes which average about .05 mm. in thickness.

Our method of determining the time when the reaction between the ammonia and the pectin has produced the optimum gelling qualities is to withdraw small samples from the batch at regular intervals, dry them in a current of warm air, and test them for jelling properties, such as firmness, lack of syneresis, color and clarity by converting the sample to a sugarless gel by the use of one of the lactones mentioned above. This type of test procedure is essential in obtaining a product which will give the best type of gel by our process as it is possible to overtreat the pectin. In the above example, under the conditions there present we found that if the exposure of pectin to the ammonia vapors was extended to forty-eight hours, the gelling properties of the pectate were destroyed.

While we prefer to utilize ammonium pectate in our process, because of its ease of preparation without excessive depolymerization it is also possible to use the alkali metal pectates such as the sodium or potassium pectates, in the same proportions by weight and under the same conditions as described above for the use of ammonium pectates. Methods for the preparation of these alkali metal salts of pectic acid are available in the literature. However, these pectates should preferably be of high molecular weight in order that the best gels may be obtained. It is apparent that it is not necessary to completely demethylate the pectin but it is sufficient to demethylate the pectin to an extent capable of forming a pectic acid gel. Accordingly, it is to be understood that the term "pectate," as used in the appended claims, is intended to include not only completely demethylated pectin but also partially demethylated pectins which are capable of forming pectic acid type gels.

While the invention has been described in detail with specific examples, such examples are illustrative and are not given as limitations, since other modifications within the spirit and scope of the invention will be apparent to those skilled in the art. Hence, the invention is to be understood as limited only as indicated, in the appended claims, in which the intent is to set forth all the novelty over the prior art.

We claim as our invention:

1. A composition of matter which comprises a mixture of a pectic substance selected from the group consisting of ammonium, sodium and potassium pectates, and a lactone capable of reacting with water to yield a weak acid which is capable of reacting with the pectic substance to form a homogeneous gel.

2. A composition of matter which comprises a mixture of ammonium pectate and a lactone capable of reacting with water to yield a weak acid which is capable of reacting with the pectic substance to form a homogeneous gel.

3. A process of producing a gel from a soluble pectic substance of high molecular weight which comprises dissolving in water a pectate substance selected from the group consisting of ammonium, sodium and potassium pectates and causing said pectate solution to form a homogeneous gel by means of a lactone capable of reacting with water to liberate a weak acid which is capable of forming a homogeneous gel from said pectate solution.

4. A composition of matter which comprises a mixture of sodium pectate and a lactone capable of reacting with water to yield a weak acid which is capable of reacting with the pectic substance to form a homogeneous gel.

5. A composition of matter which comprises a mixture of potassium pectate and a lactone capable of reacting with water to yield a weak acid which is capable of reacting with the pectic substance to form a homogeneous gel.

6. A composition of matter which comprises a mixture of a pectic substance selected from the group consisting of ammonium, sodium and potassium pectates, and delta glucono lactone.

7. A composition of matter which comprises a mixture of ammonium pectate and delta glucono lactone.

8. Process of producing gel from an ammonium pectate which comprises dissolving said pectate in water and causing said pectate to form a homogeneous gel by means of delta glucono lactone.

LACEY H. EVANS.
LOUIS J. HUBER.